United States Patent [19]

Marano, Jr. et al.

[11] 4,335,181

[45] Jun. 15, 1982

[54] MICROWAVEABLE HEAT AND GREASE RESISTANT CONTAINERS

[75] Inventors: John P. Marano, Jr., Princeton; Maya S. Farag, North Brunswick, both of N.J.

[73] Assignee: Mobil Oil Corporation, New York, N.Y.

[21] Appl. No.: 164,993

[22] Filed: Jul. 1, 1980

[51] Int. Cl.³ .................... B32B 5/18; B32B 7/00; B32B 27/00

[52] U.S. Cl. ................... 428/319.3; 426/107; 426/113; 426/234; 428/319.7; 428/483; 428/516; 428/476.1; 428/520

[58] Field of Search ............... 428/315, 483, 35, 516, 428/520, 194; 426/107, 113, 124, 127, 234

[56] References Cited

U.S. PATENT DOCUMENTS

| | | | |
|---|---|---|---|
| 3,444,283 | 5/1969 | Carlson, Jr. | 264/53 |
| 3,619,445 | 11/1971 | Carlson, Jr. | 264/565 |
| 3,649,437 | 3/1972 | Woliniski et al. | 428/315 |
| 3,682,730 | 8/1972 | Haase | 156/79 |
| 4,015,033 | 3/1977 | Nield | 428/516 |
| 4,022,646 | 5/1977 | Casey | 428/516 |
| 4,066,731 | 1/1978 | Hungerford | 264/216 |
| 4,086,287 | 4/1978 | Kaeding et al. | 260/671 R |
| 4,107,362 | 8/1978 | Valyi | 428/483 |
| 4,111,349 | 9/1978 | Buckler et al. | 428/516 |
| 4,205,114 | 5/1980 | Canterino et al. | 428/315 |
| 4,218,510 | 8/1980 | Willson | 428/483 |

*Primary Examiner*—William J. Van Balen
*Attorney, Agent, or Firm*—Charles A. Huggett; Michael G. Gilman; Hastings S. Trigg

[57] ABSTRACT

There are provided microwaveable shaped articles of a laminate of heat resistant film and a substrate of foamed or unfoamed sheet of polymers or copolymers with a softening temperature below 190° F., in which the heat resistant film is on the interior surface.

7 Claims, No Drawings

MICROWAVEABLE HEAT AND GREASE RESISTANT CONTAINERS

BACKGROUND OF THE INVENTION

1. Field of the Invention

This invention is concerned with trays and containers adaptable for holding food, often containing fats, for cooking in a microwave oven.

2. Description of the Prior Art

It is well known in the art to produce various shaped articles from foamed and unfoamed polystyrene sheet by thermoforming methods. Many such articles are containers used for packaging foods.

Polystyrene containers, however, are melted by hot fats and cannot be used to package fat-containing foods that are to be heated in a microwave oven. Similarly, containers made from poly(p-methylstyrene) are not per se resistant to hot fats when heated in a microwave oven. In general, containers made from any polymer or copolymer with a softening temperature below 190° F. (87.8° C.) are not resistant to hot fats when heated in a microwave oven.

It is the discovery of this invention that containers made from laminates of heat resistant film and foamed or unfoamed sheet of polymers or copolymers with a softening temperature below 190° F. (87.8° C.), in which the heat resistant film is on the interior surface, are resistant to hot fats when heated in a microwave oven.

SUMMARY OF THE INVENTION

This invention provides shaped articles of a laminate of heat resistant film and foamed or unfoamed sheet of polymers or copolymers with a softening temperature below 190° F. (87.8° C.), in which the heat resistant film is on the interior surface.

DESCRIPTION OF SPECIFIC EMBODIMENTS

One monomer used in preparing the homopolymer or copolymers from which the exterior or substrate of the shaped articles or containers of this invention are made is p-methylstyrene. Others are styrene and alpha mono-olefins such as ethylene, propylene, and butene-1. It is within the contemplation of this invention to use mixtures of methylstyrene rich in p-methylstyrene. Such mixtures contain at least 90 weight percent, preferably 95-99 weight percent, p-methylstyrene and less than 0.1 weight percent o-methylstyrene, with the balance being m-methylstyrene. A typical mixture contains, by weight, about 95 percent p-methylstyrene, about 5 percent m-methylstyrene, and about 0.05 percent o-methylstyrene. The mixtures are obtained by catalytic dehydrogenation of the mixtures of ethylmethyl benzene isomers described in U.S. Pat. No. 4,086,287, incorporated herein by reference.

The substrate polymers contemplated herein are polymers and copolymers with a softening temperature below 190° F. (87.8° C.). Such polymers include polyethylene, polypropylene, polybutene-1, and copolymers containing up to about 10 weight percent of comonomer (second named monomer), such as ethylene-propylene, propylene-ethylene, butene-1-ethylene, ethylene-hexene-1, and ethylene-octene-1, styrene, or p-methylstyrene or p-methylstyrene-rich isomer mixture homopolymer or their copolymers containing between about 10 and about 1 weight percent conjugated diene, such as butadiene and isoprene. The polymerization reaction is carried out by using methods and catalysts well known in the art for polymerizing olefinic hydrocarbons. The reaction can be carried out in solution, bulk, suspension, or emulsion.

The manner by which foamed sheet is prepared from the aforedescribed polymers or copolymers is not an essential feature of this invention. The general methods of forming foamed sheet are discussed in U.S. Pat. No. 3,444,283 which is incorporated herein by reference. The preferred method is a direct injection extrusion operation described in U.S. Pat. No. 3,619,445, incorporated herein by reference, which describes the complete direct injection extrusion foam lines. Ser. No. 506,836, referred to in U.S. Pat. No. 3,619,445, is now U.S. Pat. No. 3,444,283. As described in these incorporated patents, nucleating or cell size control agents can be used.

Likewise, the manner by which unfoamed sheet is prepared from the aforedescribed polymers or copolymers is not an essential feature of this invention. Any of the methods well known in the art can be used, such as extrusion through a slot die. The sheet can be oriented or non-oriented.

The foamed or unfoamed substrate sheet is laminated with a film of heat resistant thermoplastic polymer. The preferred film is polyacrylonitrile film, which can be produced as described in U.S. Pat. No. 4,066,731. Other heat resistant thermoplastic polymers can be used to form the film for lamination, however, including polyesters and nylons. In general, film thickness can be between about 0.5 mil and about 2 mils.

The film can be laminated to the foamed or unfoamed substrate sheet by any of the methods well known in the art, such as by adhesives or surface treatment with corona discharge followed by pressure. In U.S. Pat. No. 3,682,730, there is described a method utilizing freshly prepared foam sheet that still contains residual foaming agents, e.g., pentane or isopentane, which patent is incorporated herein by reference.

The processes of thermoforming to produce shaped articles are well known to those skilled in the art. A generally preferred method of thermoforming is vacuum forming. The shaped articles produced by thermoforming the foamed or unfoamed sheet laminate can vary widely. Typical shapes that are utilizable include trays, tubs, bowls, cups, and the like. Such shaped articles are adaptable for packaging foods and, particularly, for packaging foods containing fats.

The efficacy of the laminates of this invention in preventing melt-through by fats under microwave oven conditions was demonstrated in the following test procedure. A heat resistant film was placed upon a piece of polymer with a softening point below 190° F. (87.8° C.), i.e., substrate polymer. A piece of uncooked bacon was placed upon the heat resistant film. Then, the resultant assembly was placed in a microwave oven for three (3) minutes to cook the bacon.

Using this test procedure, a series of assemblies were tested. These assemblies are set forth in the following Table. In each example, there was no melt-through by hot bacon fat.

TABLE

| Example | Substrate | Foamed? | Heat Resistant Film |
|---------|-----------|---------|---------------------|
| 1 | PPMS | Yes | PAN |
| 2 | PPMS | " | PET |
| 3 | PS | " | PAN |
| 4 | PS | " | PET |

TABLE-continued

| Example | Substrate | Foamed? | Heat Resistant Film |
| --- | --- | --- | --- |
| 5 | PE | No | PAN |
| 6 | PE | " | PET |
| 7 | PP | " | PAN |
| 8 | PP | " | PET |

PPMS = poly (p-methylstyrene) (97% para))
PS = polystyrene
PE = polyethylene
PP = polypropylene
PAN = polyacrylonitrile
PET = polyethylene terephthalate Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. Shaped articles of a laminate of non-crosslinked heat resistant film and a substrate of foamed or unfoamed sheet of polymers or copolymers with a softening temperature below 190° F., in which the heat resistant film is on the interior surface; said articles being resistant to hot fats when heated in microwave oven.

2. Shaped articles defined in claim 1, wherein said heat resistant film is polyacrylonitrile film.

3. Shaped articles defined in claim 1, wherein said heat resistant film is polyethylene terphthalate film.

4. Shaped articles defined in claims 1, 2, or 3, wherein said substrate is foamed poly(p-methylstyrene) sheet.

5. Shaped articles defined in claims 1, 2, or 3, wherein said substrate is foamed polystyrene sheet.

6. Shaped articles as defined in claims 1, 2, or 3, wherein said substrate is unfoamed polyethylene sheet.

7. Shaped articles as defined in claims 1, 2, or 3, wherein said substrate is unfoamed polypropylene sheet.

* * * * *